Figure 2:
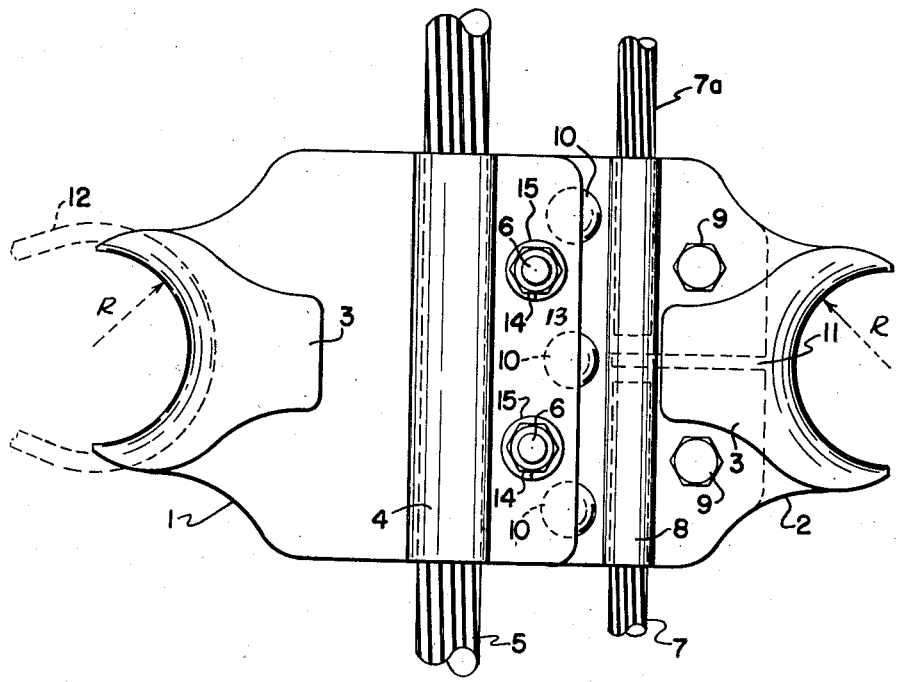

Oct. 6, 1959     C. G. SORFLATEN ET AL     2,907,812
MID-SPAN TAP CLAMP
Filed July 7, 1953

INVENTORS
Chester G. Sorflaten
George R. Whiteside

United States Patent Office 2,907,812
Patented Oct. 6, 1959

2,907,812

MID-SPAN TAP CLAMP

Chester G. Sorflaten, Chicago, and George R. Whiteside, Wilmington, Ill.; said Whiteside assignor to said Sorflaten Application July 7, 1953, Serial No. 366,586

5 Claims. (Cl. 174—44)

This invention relates to an improved device for attaching a wire or cable to a tensioned aerial messenger or conductor of electricity where the attachment is made in the open span between the points of support of the tensioned aerial messenger or conductor of electricity. Tapping off of secondary power distribution systems to provide electricity for the average home, store, etc. has received a great deal of attention in the past and numerous devices and clamps have been proposed for establishing connections between a secondary and a service drop. Such devices and clamps have been successful in achieving structurally and electrically sound connections but in substantially every case due to the limitations of the devices, the connections necessarily had to be made at a utility pole support. It is desired at times to make such tap-offs between utility poles or points of support, and when that is done many additional problems arise that are not present if the connection is made at a support point. For example, a mid-span connection of a wire provides the supporting means for terminating one end of the wire which also may be under tension due to weight of the wire or cable and any accumulation of ice and wind loads between its points of support.

It is consequently an object of the present invention to provide a device for terminating one tensioned wire-shaped metallic element to another tensioned wire-shaped metallic element to establish a mid-span connection therebetween.

A more specific object of the invention is to provide a device for terminating a wire conductor or neutral messenger to a tensioned messenger or conductor to provide a mid-span mechanical support.

A feature of this invention resides in the provision for attaching and terminating an additional wire or cable. That is, if desired another neutral messenger or wire conductor may be supported mechanically and connected electrically to the tensioned messenger by means of the same device. The additional wire or cable is terminated from the opposite direction thereby tending to balance the lateral pull or force exerted on the tensioned aerial messenger or conductor of electricity.

A further feature of this invention resides in the provision for electrically connecting each of the two wires or cables that are terminated at this device. An electrical path is provided through the body of the device itself to the tensioned aerial messenger or conductor of electricity to which it is clamped.

With these and other features and objects in view this invention consists of a combination of parts as will hereinafter be fully described and claimed and illustrated in the accompanying drawing which forms a part hereof, but it is understood that changes may be made without departing from the spirit of the invention.

Figure 1:
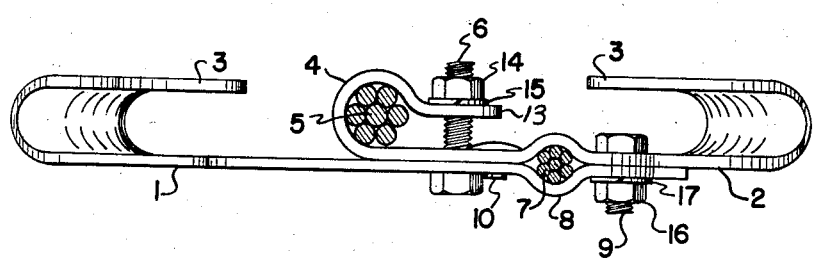

In the drawing forming a part of this specification,

Figure 1 illustrates the side view of a device constructed in accordance with one embodiment of the invention, and, Figure 2 illustrates the top view of the device.

The illustrated embodiment comprises two metallic members indicated as 1 and 2 in the drawings. These members are constructed of some metallic material (compatible with the material in the messenger from a corrosion standpoint) and are joined together by rivets 10 so that the two parts form a single unit. Each end of the device is formed into a saddle-shaped hook 3 in such a way that the inside of each hook thus formed provides a smooth convex-running groove or three-sided channel in which a service wire, bail of a service type dead end, or cable 12 may be securely attached. Wire, bail or cable 12 constitutes the tensioned wire-shaped metallic element which is terminated to a tensioned wire-shaped metallic element 5 to establish a mid-span mechanical support. Also provided is a generous radius R for each hook to protect the terminated wire, neutral messenger or other device employed to terminate service wire cable 12 from a sharp bend that might otherwise disturb the lay of a stranded cable.

The formed loop 4 is shaped to envelope or fit over the tensioned messenger or conductor of electricity 5 and a flange or projection 13 of the loop provides means for tightening this loop securely around the tensioned messenger or conductor 5 by the bolts 6 and nuts 14 which draw the loop tight. The lock washers 15 hold the nuts in place.

The ends of the attached wires or cables 7 and 7a are electrically connected to the tensioned messenger or conductor of electricity 5 through the body of the device by inserting the ends of the attached wires or cables 7 and 7a into a formed groove or chamber 8 in parts 1 and 2 of the device. It should be understood that wire 7 or 7a is usually the free end of the terminated wire or neutral messenger 12; wire 7 or 7a establishes the electrical connection to the clamp and consequently to the tensioned secondary messenger or conductor 5, while wire 12 establishes the physical connection in well known dead-end fashion. The strain of each terminated wire will be borne by the connection around one of saddle-shaped portions 3. Each wire or cable 7, 7a is inserted half the width of the device to the slot 11 in part 1 and each is clamped individually by the bolts 9 and nuts 16 which securely grip the wires or cables in the groove 8. The slot 11 in part 1 allows each wire or cable to be gripped separately. The lock washers 17 hold the nuts in place.

To further illustrate, assume that the mid-span tap clamp shown in Figures 1 and 2 is used to take up the mechanical strain and also to effect an electrical connection to two different service drops. In such case, the neutral wire of one service drop is coiled around the left hand hook 3 and the neutral wire of the other service drop is coiled around the right hand hook, as illustrated by element 12. Each neutral wire is looped back and clamped to itself by a suitable dead-end clamp away from the mid-span connector in any conventional manner, and the free ends of the two service drop neutrals inserted into each end of groove 8 as shown by elements 7 and 7a. The mechanical strain of the service drops is consequently borne by hooks 3 while the electrical connection to the tensioned messenger 5 is effected in groove 8. It should be apparent that hooks 3 are provided for mechanical support only, that the function of the entire clamp is for structurally supporting these service neutrals and that electrical connections to the secondary messenger can be made either through the clamp as described or may be made by a separate electrical connection.

Thus, among others the several objects and features of the invention as specifically aforenoted are achieved. Obviously numerous changes in construction and rearrangement of the parts might be resorted to without departing from the spirit of the invention as defined by the claims.

We claim:

1. A device for terminating a service neutral messenger to a tensioned secondary neutral messenger to establish a mid-span connection therebetween comprising: a first flat-shaped metallic element; a second flat-shaped metallic element; and means for mechanically and electrically securing a portion of said first element to a portion of said second element in parallel relationship, an unsecured portion of said first element being shaped to form a hook to provide a mechanical anchor connection for said service neutral messenger and an unsecured portion of said second element being formed to provide an electrical as well as mechanical connection to said secondary messenger, said first and second elements being separated within the area determined by the secured portions to provide a chamber through which said service neutral messenger may be inserted to establish an electrical connection to said secondary neutral messenger.

2. A device for terminating a service neutral messenger to a tensioned secondary neutral messenger to establish a mid-span connection therebetween comprising: a first flat-shaped metallic element; a second flat-shaped metallic element; and means for mechanically and electrically securing a portion of said first element to a portion of said second element in parallel relationship, an unsecured portion of said first element being shaped to form a hook to provide a mechanical anchor connection for said service neutral messenger and an unsecured portion of said second element being formed to provide an electrical as well as mechanical connection to said secondary messenger, portions of said first and second elements being separated to provide opposed grooves for receiving the free end of said service neutral messenger to establish an electrical connection between said service neutral messenger and said secondary neutral messenger.

3. A device for terminating a service neutral messenger of a predetermined diameter to a tensioned secondary neutral messenger to establish a mid-span connection therebetween, comprising: a metallic member have a substantially flat-shaped portion, with its thickness dimension being relatively small compared to its width dimension, merging into a thimble-like saddle-shaped portion providing a three-sided channel of substantially constant width running in a convex direction, when viewed from the open side of the channel, with a predetermined radius of curvature, into which said service neutral messenger may be positioned to facilitate the establishment of a mechanical connection to said service neutral messenger, the width of said channel being slightly larger than the diameter of said service neutral messenger but being small relative to said radius of curvature, said channel, when viewed from the diametrically opposite side, providing a segment of a ring to define a concave running surface, a portion of said metallic member being formed to provide a groove for accommodating the free end of said service neutral messenger; clamping means for effecting an electrical as well as mechanical connection between said metallic member and a length of said secondary messenger substantially equal to the width dimension of said flat-shaped portion and having a groove formed therein for cooperating with said first-mentioned groove to effect an electrical connection between said metallic member and said service neutral messenger thereby providing an electrical connection between said messengers.

4. A device for terminating a first and a second service neutral messenger, each of predetermined diameter, to a tensioned secondary neutral messenger the establish mid-span connections therebetween, comprising: an elongated metallic member having a substantially flat-shaped central portion, with its thickness dimension being relatively small compared to its width dimension, separating two thimble-like, saddle-shaped portions one of which provides a first three-sided channel of substantially constant width running in a convex direction, when viewed from the open side of said first channel, with a predetermined radius of curvature, into which said first service neutral messenger may be positioned to facilitate the establishment of a mechanical connection to said first service neutral messenger, the width of said first channel being slightly larger than the diameter of said first service neutral messenger but being small relative to the radius of curvature of said first channel, said first channel, when viewed from the diametrically opposite side, providing a segment of a ring to define a concave running surface, and the other of which saddle-shaped portions provides a second three-sided channel of substantially constant width running in a convex direction, when viewed from the open side of said second channel, with a predetermined radius of curvature, into which said second service neutral messenger may be positoned to facilitate the establishment of a mechanical connection to said second service neutral messenger, the width of said second channel being slightly larger than the diameter of said second service neutral messenger but being small relative to the radius of curvature of said second channel, said second channel, when viewed from the diametrically opposite side, providing a segment of a ring to define a concave running surface; clamping means for effecting an electrical as well as mechanical connection between said metallic member and a length of said secondary messenger substantially equal to the width dimension of said flat-shaped portion; additional clamping means for effecting an electrical connection between said metallic member and said first service neutral messenger thereby providing an electrical connection between said first service neutral messenger and said secondary neutral messenger; and further clamping means for effecting an electrical connection between said metallic member and said second service neutral messenger thereby providing an electrical connection between said second service neutral messenger and said secondary messenger.

5. A device for terminating a service neutral messenger of a predetermined diameter to a tensioned secondary neutral messenger to establish a mid-span connection therebetween, comprising: a first flat-shaped metallic element; a second flat-shaped metallic element; and means for mechanically and electrically securing a portion of said first element to a portion of said second element in parallel relationship, an unsecured portion of said first element being saddle shaped to provide a three-sided channel of substantially constant width running in a convex direction, when viewed from the open side of the channel, with a predetermined radius of curvature, into which said service neutral messenger may be looped to effect a mechanical anchor connection for said service neutral messenger, the width of said channel being slightly larger than the diameter of said service neutral mesenger but being small relative to said radius of curvature, said channel, when viewed from the diametrically opposite side, providing a segment of a ring to define a concave running surface, and an unsecured portion of said second element being formed into a clamp to provide a mechanical connection to said secondary messenger, portions of said first and second elements being formed to provide opposed grooves for accommodating the free end of said service neutral messenger to effect an electrical connection between said service neutral messenger and said secondary neutral messenger.

References Cited in the file of this patent

UNITED STATES PATENTS

| | | |
|---|---|---|
| 312,755 | Patterson | Feb. 24, 1885 |
| 702,952 | Imhoof | June 24, 1902 |
| 1,742,839 | Williams | Jan. 7, 1938 |
| 2,391,428 | Link | Dec. 25, 1945 |
| 2,462,247 | Wright | Feb. 22, 1949 |
| 2,640,667 | Winn | June 2, 1953 |
| 2,668,239 | Jipp | Feb. 2, 1954 |
| 2,710,888 | Edwards | June 14, 1955 |